(12) United States Patent
Haida

(10) Patent No.: US 10,996,653 B2
(45) Date of Patent: May 4, 2021

(54) THREE-DIMENSIONAL OBJECT BUILDING DEVICE, THREE-DIMENSIONAL OBJECT BUILDING METHOD, AND METHOD OF PRODUCING THREE-DIMENSIONAL OBJECT

(71) Applicant: Kazuo Haida, Kanagawa (JP)

(72) Inventor: Kazuo Haida, Kanagawa (JP)

(73) Assignee: RICOH COMPANY LTD., Tokyo (JP)

( * ) Notice: Subject to any disclaimer, the term of this patent is extended or adjusted under 35 U.S.C. 154(b) by 71 days.

(21) Appl. No.: 16/351,686

(22) Filed: Mar. 13, 2019

(65) Prior Publication Data

US 2019/0286103 A1    Sep. 19, 2019

(30) Foreign Application Priority Data

Mar. 16, 2018  (JP) ................................. 2018-049495
Feb. 13, 2019  (JP) ............................. JP2019-023602

(51) Int. Cl.
   *G05B 19/4099*   (2006.01)
(52) U.S. Cl.
   CPC ............... *G05B 19/4099* (2013.01); *G05B 2219/49023* (2013.01)
(58) Field of Classification Search
   CPC ...... G05B 19/4099; G05B 2219/49023; B33Y 50/02; B33Y 10/00; B29C 64/112; B29C 64/393
   See application file for complete search history.

(56) References Cited

U.S. PATENT DOCUMENTS

| 6,572,807 B1 * | 6/2003 | Fong ..................... B33Y 10/00 264/237 |
| 2008/0192074 A1 * | 8/2008 | Dubois ................. B33Y 50/02 347/5 |

(Continued)

FOREIGN PATENT DOCUMENTS

| JP | 2013-043338 | 3/2013 |
| JP | 2017-013351 | 1/2017 |

(Continued)

OTHER PUBLICATIONS

U.S. Appl. No. 15/752,317, filed Feb. 13, 2018.

*Primary Examiner* — Thomas C Lee
*Assistant Examiner* — Michael Tang
(74) *Attorney, Agent, or Firm* — Harness, Dickey & Pierce, P.L.C.

(57) ABSTRACT

A three dimensional object building device includes a generation unit and a movement controller. The generation unit is configured to generate layer information for each layer of a three-dimensional (3D) object from height information and color information, the height information including information on a three-dimensional position of each pixel of the 3D object, information on a diameter of a dot of build material for the pixel, and information on a gap from an ejection surface of a build unit when the build material for the pixel is to be ejected, the color information indicating a color of each pixel of the 3D object. The movement controller is configured to, when build material for a pixel indicated by the layer information is to be deposited, move the build unit to make a gap correspond to a diameter of a dot for the pixel.

13 Claims, 12 Drawing Sheets

(56) References Cited

U.S. PATENT DOCUMENTS

| | | | |
|---|---|---|---|
| 2009/0256880 A1* | 10/2009 | Ohnishi | B41J 11/0015 347/17 |
| 2016/0243820 A1* | 8/2016 | Yanaka | B41J 2/2054 |
| 2017/0182715 A1 | 6/2017 | Haida | |
| 2017/0185069 A1 | 6/2017 | Haida | |
| 2018/0056671 A1* | 3/2018 | Boniface | B41J 11/002 |

FOREIGN PATENT DOCUMENTS

| | | | |
|---|---|---|---|
| JP | 2017-039313 | 2/2017 | |
| WO | WO-2017029816 A2 * | 2/2017 | G06T 19/20 |

* cited by examiner

FIRST LAYER DATA

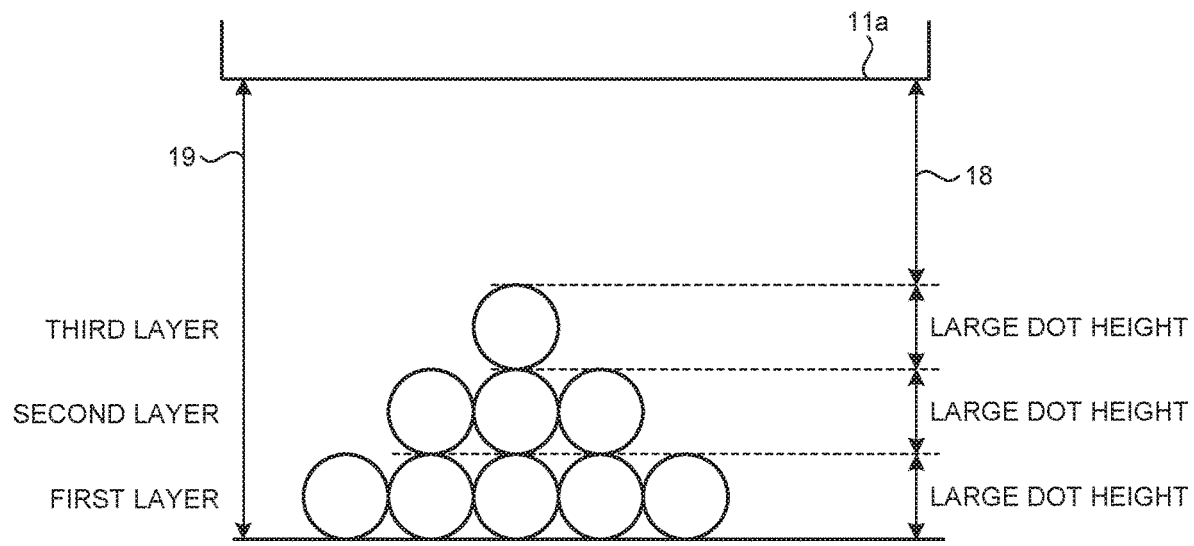
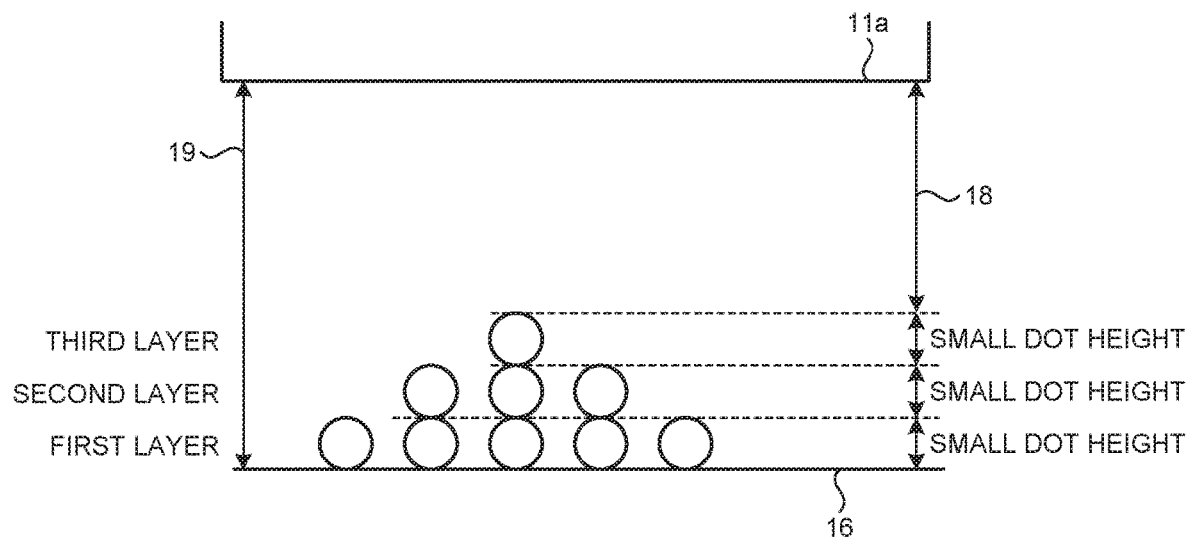

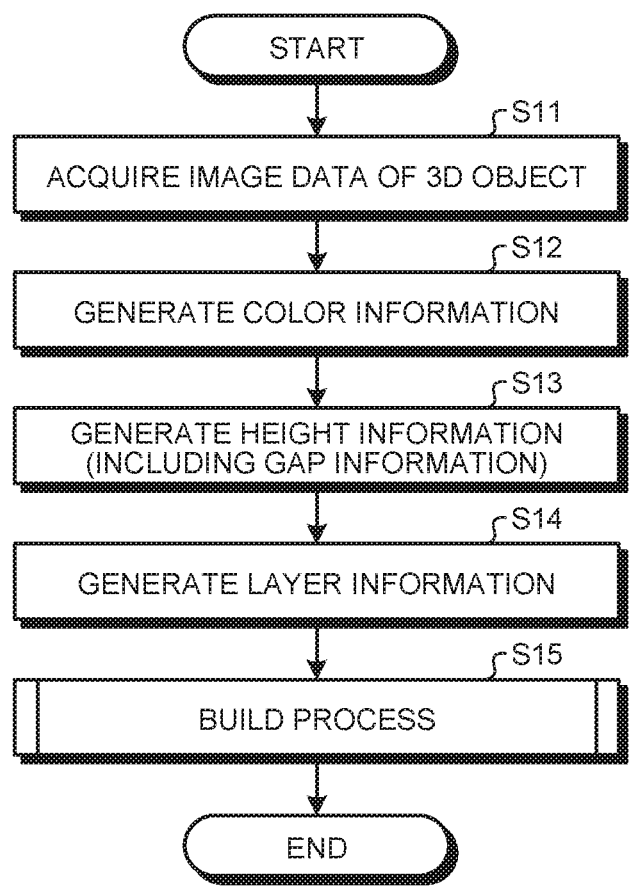

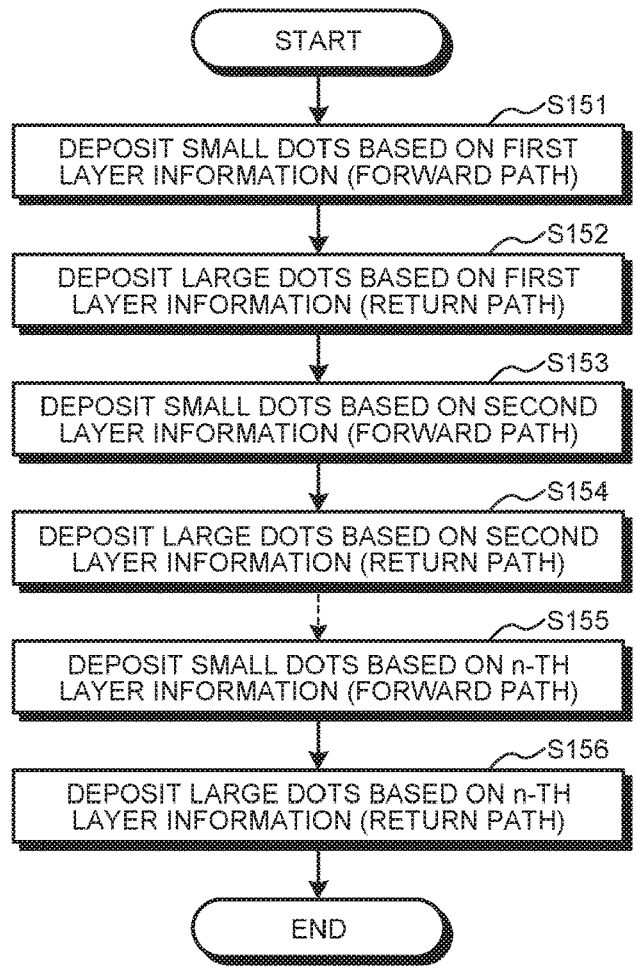
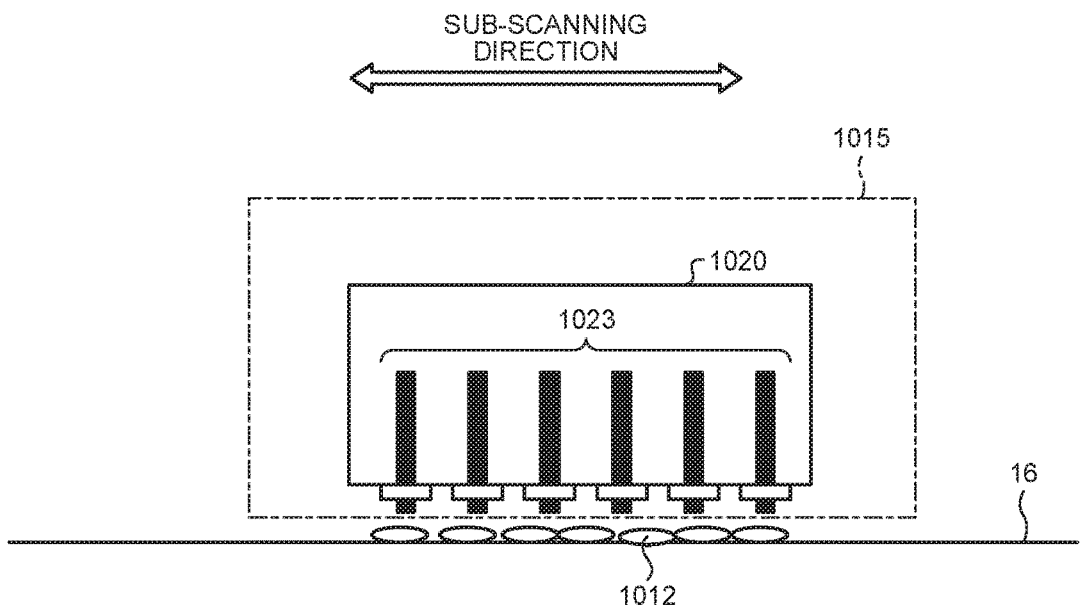

THREE-DIMENSIONAL OBJECT BUILDING DEVICE, THREE-DIMENSIONAL OBJECT BUILDING METHOD, AND METHOD OF PRODUCING THREE-DIMENSIONAL OBJECT

CROSS-REFERENCE TO RELATED APPLICATIONS

The present application claims priority under 35 U.S.C. § 119 to Japanese Patent Application No. 2018-049495, filed on Mar. 16, 2018 and Japanese Patent Application No. 2019-023602, filed on Feb. 13, 2019. The contents of which are incorporated herein by reference in their entirety.

BACKGROUND OF THE INVENTION

1. Field of the Invention

The present invention relates to a three dimensional object building device, a three dimensional object building method, and a method of producing a three-dimensional object.

2. Description of the Related Art

Methods of building a three-dimensional (3D) object have been known, such as ink jetting, fused deposition modeling, rapid prototyping, binder jetting, stereolithography, and selective laser sintering.

For example, Japanese Unexamined Patent Application Publication No. 2013-043338 discloses an example technology of ink jetting. This technology sequentially performs deposition of a build material and application of ink to the surface of the deposited material to build a 3D object. This configuration can simultaneously complete building of the 3D object and printing on the surface of the 3D object.

However, when such a conventional technology is used to build a 3D object made of a large number of layers, differences in the layers are accumulated, resulting in lower reproducibility in shape due to the multi-layered structure. This also causes image degradation such as image banding or ink misting due to the defects in shape. In particular, when a 3D object is built with ink dots having different diameters such as large dots and small dots and these dots are ejected under the same conditions, differences accumulated in the layers are more significant.

SUMMARY OF THE INVENTION

According to one aspect of the present invention, a three dimensional object building device includes a generation unit and a movement controller. The generation unit is configured to generate layer information for each layer of a three-dimensional (3D) object from height information and color information, the height information including information on a three-dimensional position of each pixel of the 3D object, information on a diameter of a dot of build material for the pixel, and information on a gap from an ejection surface of a build unit when the build material for the pixel is to be ejected, the color information indicating a color of each pixel of the 3D object. The movement controller is configured to, when build material for a pixel indicated by the layer information is to be deposited, move the build unit to make a gap correspond to a diameter of a dot for the pixel.

BRIEF DESCRIPTION OF THE DRAWINGS

FIGS. 14A and 14B are diagrams illustrating comparison between building a 3D object with large dots and building a 3D object with small dots;

FIG. 16 is a flowchart illustrating an example procedure of a 3D-object production process according to the embodiment;

FIG. 17 is a flowchart illustrating an example procedure of a build process of the 3D-object production process; and FIG. 18 is a diagram illustrating an example mechanical configuration of a head unit according to a modification of the embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENT

Figure 1:
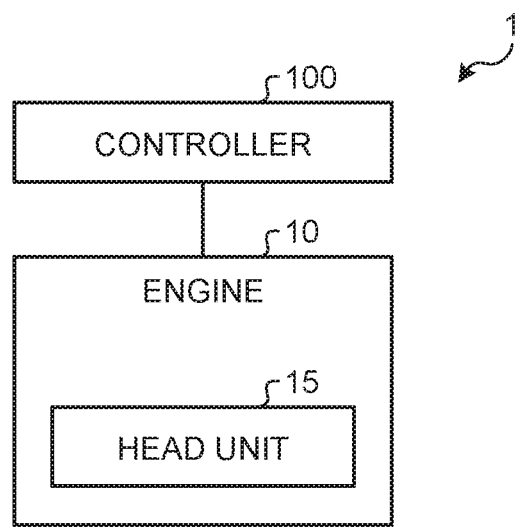
FIG. 1 is a diagram illustrating an example general configuration of an inkjet recording device according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a three dimensional object building device, a three dimensional object building method, and a method of producing a 3D object that can reduce the differences accumulated in the layers in building a 3D object and can prevent degradation of reproducibility in color and shape.

The following describes an embodiment of the three dimensional object building device, three dimensional object building method, and method of producing a 3D object according to the present invention with reference to FIGS. 1 to 18. The embodiment described below is not intended to limit the scope of the present invention. The constituent elements of the embodiment include those that can be easily thought of by the skilled person, those that are substantially the same, or what is called the equivalents thereof. These constituent elements can be omitted, replaced, modified, or combined as appropriate without departing from the scope of the embodiment below.

The following describes an inkjet recording device, as an example of the three dimensional object building device, including a piezoelectric inkjet head that ejects ultraviolet (UV) curable ink (radiation curable ink) as a build material to a recording medium to build (form) a 3D object on the recording medium. The three dimensional object building device is, however, not limited to this.

The recording medium may be any type of medium on which a 3D object can be built. For example, the recording medium may be recording paper or canvas, but is not limited to this. The build material is not limited to the UV curable ink, and may be any type of build material that is not mixable and provides shape stability after being deposited. The build material may have a liquid or gel form at the time of deposition. The build material may be an ink that is softened or cured by heat or by being left as it is.

General Configuration of Inkjet Recording Device

FIG. 1 is a diagram illustrating an example general configuration of an inkjet recording device according to the embodiment. As illustrated in FIG. 1, this inkjet recording device 1 includes an engine 10 and a controller 100.

The engine 10 is configured to build (form) a 3D object on a recording medium. Specifically, the engine 10 includes a head unit 15 that ejects UV curable ink to the recording medium. The UV curable ink is deposited on the recording medium and a 3D object is built thereon.

The controller 100 performs control to build (form) a 3D object on a recording medium. Specifically, the controller 100 generates information for building a 3D object and causes the engine 10 to build the 3D object based on the generated information.

Hardware Configuration of Controller

Figure 2:
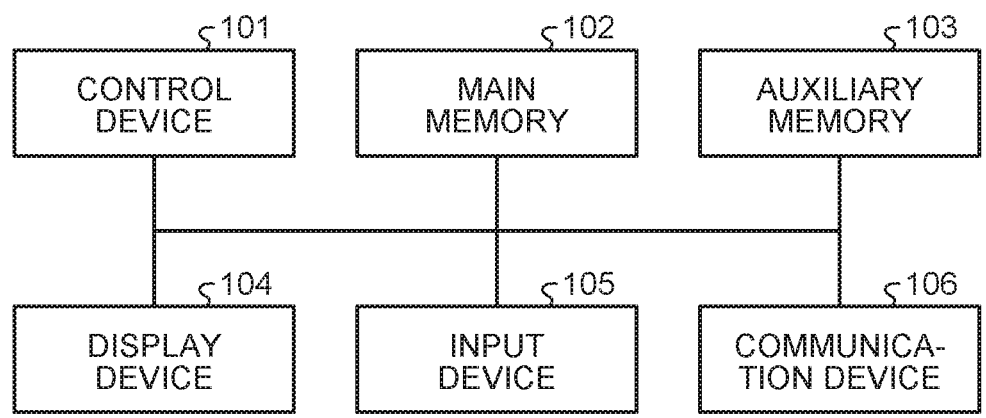
FIG. 2 is a diagram illustrating an example hardware configuration of a controller of the inkjet recording device according to the embodiment.

FIG. 2 is a diagram illustrating an example hardware configuration of the inkjet recording device according to the embodiment. As illustrated in FIG. 2, the controller 100 includes a control device 101 such as a central processing unit (CPU), a main memory 102 such as a random access memory (RAM), an auxiliary memory 103 such as a hard disk drive (HDD) or a solid state drive (SSD), a display device 104 such as a display, an input device 105 such as a touchscreen or a key switch, and a communication device 106 such as a communication interface. The controller 100 has a hardware configuration implemented by a general-purpose computer.

Mechanical Configuration of Head Unit

Figure 3:
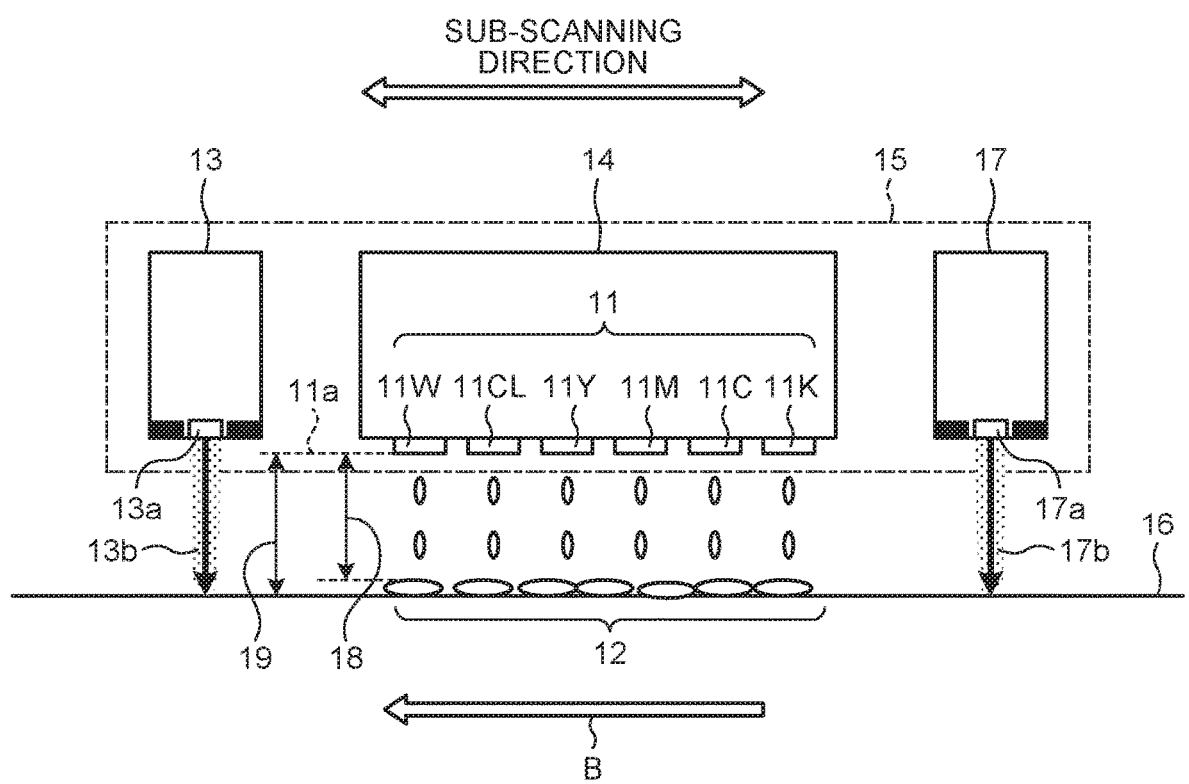
FIG. 3 is a diagram illustrating an example mechanical configuration of a head unit according to the embodiment.

FIG. 3 is a diagram illustrating an example mechanical configuration of the head unit according to the embodiment. As illustrated in FIG. 3, the head unit 15 includes an inkjet head 14, a UV irradiation device 13 (curing light irradiation unit), and a UV irradiation device 17 (curing light irradiation unit).

The inkjet head 14 includes a nozzle array 11 that ejects the UV curing ink to a recording medium 16. The nozzle array 11 illustrated in FIG. 3 is configured by a nozzle 11W that ejects white (W) UV curable ink, a nozzle 11CL that ejects clear (CL) UV curable ink, a nozzle 11Y that ejects yellow (Y) UV curable ink, a nozzle 11M that ejects magenta (M) UV curable ink, a nozzle 11C that ejects cyan (C) UV curable ink, and a nozzle 11K that ejects black (K) UV curable ink. The configuration of the nozzle array 11 is not limited to the configuration illustrated in FIG. 3. For example, the nozzle array 11 may exclude the nozzle 11CL. The nozzle array 11 may include any number of nozzles 11W, 11CL, 11Y, 11C, 11M, and 11K if the nozzle array 11 includes at least one of each. Each nozzle of the inkjet head 14 can optionally adjust the amount of UV curable ink to be ejected in accordance with height information, or layer information including the height information, which will be described later. This adjustment determines the diameter of the UV curable ink (dot) upon landing.

Although details will be described later, white (W) and clear (CL) UV curable inks are for use in building the shape of a 3D object, whereas yellow (Y), cyan (C), magenta (M), and black (K) inks are for use in forming colors on the 3D object.

The UV irradiation device 13 includes an irradiation unit 13a that irradiates the UV curable ink 12 ejected from the inkjet head 14 and deposited on the recording medium 16 with curing light 13b, which is UV light, while the inkjet head 14 moves in a sub-scanning direction (opposite direction to the direction of arrow B). The UV curable ink 12 deposited on the recording medium 16 is cured by the curing light 13b emitted from the UV irradiation device 13.

The UV irradiation device 17 includes an irradiation unit 17a that irradiates the UV curable ink 12 ejected from the inkjet head 14 and deposited on the recording medium 16 with curing light 17b, which is UV light, while the inkjet head 14 moves in the sub-scanning direction (in the direction of arrow B). The UV curable ink 12 deposited on the recording medium 16 is cured by the curing light 17b emitted from the UV irradiation device 17.

In the present embodiment, the recording medium 16 is conveyed, for example, in the direction of arrow B (sub-scanning direction). When the recording medium 16 is conveyed to a predetermined position, conveyance of the recording medium 16 is stopped and the inkjet head 14 starts ejecting the UV curable ink to the recording medium 16.

Specifically, while the head unit 15 reciprocates in the sub-scanning direction and reciprocates in a main-scanning direction that is orthogonal to the sub-scanning direction, the inkjet head 14 ejects the UV curable ink to the recording medium 16 (more specifically, to a drawing region of the recording medium 16) and the UV irradiation devices 13 and 17 irradiate the UV curable ink with the curing light 13b and 17b.

After the head unit 15 deposits one layer of UV curable ink on the recording medium 16, the head unit 15 returns to the original position, and repeats this operation until n (n≥2) layers of UV curable ink are deposited.

When n layers of UV curable ink are deposited on the recording medium 16 and a 3D object is built, the recording medium 16 on which the 3D object is built is conveyed in the direction of arrow B and is output from the inkjet recording device 1.

The head unit 15 illustrated in FIG. 3 includes the UV irradiation devices 13 and 17 at opposing sides with regard to the inkjet head 14 in the sub-scanning direction, but the configuration is not limited to this. The head unit 15 may include, for example, only the UV irradiation device 13. However, providing the UV irradiation devices 13 and 17 allows the head unit 15 to build the 3D object in both forward and return paths in the sub-scanning direction, which can increase productivity in producing the 3D object.

The ejection operation of the head unit 15 is not limited to the method described above. The ejection operation may be performed, for example, with the head unit 15 being fixed, and the recording medium 16 (specifically, for example, a table unit on which the recording medium 16 is secured) may be moved in the sub-scanning direction in a bi-directional manner and in the main-scanning direction orthogonal to the sub-scanning direction in a reciprocating manner, and the head unit 15 may cause the inkjet head 14 to eject the UV curable ink to the recording medium 16 and cause the UV irradiation devices 13 and 17 to irradiate the UV curable ink with the curing light 13b and 17b. In this case, after one layer of UV curable ink is deposited on the recording medium 16, the recording medium 16 is conveyed to the original position and the same operation is repeated until n (n≥2) layers of UV curable ink are deposited.

The UV curable ink 12 is ejected in different diameters of ink dot (which may be hereinafter simply referred to as "dot diameters") in accordance with the pixel position and in which layer the pixel is located in the 3D object to be built, as will be described later. In ejecting an ink dot of the UV curable ink 12 in a different dot diameter, the inkjet recording device 1 according to the present embodiment controls the distance (ejection gap 18) from a head ejection surface 11a (ejection surface) corresponding to the ejection surface of the nozzles of the nozzle array 11 to the vertex of a subject ink dot after landing, or in other words, the inkjet recording device 1 moves the head unit 15 upward or downward, or in the vertical direction relative to the surface of the recording medium 16, to make the ejection gap 18 correspond to the size (diameter) of the subject ink dot, as will be described later. What is controlled in this ejection operation is not limited to the ejection gap 18. The ejection operation may be performed by controlling the distance (head-to-medium gap 19) from the head ejection surface 11a to the recording medium 16, or in other words, the ejection operation may be performed by moving the head unit 15 vertically to make the head-to-medium gap 19 correspond to the size (diameter) of the subject ink dot.

Configuration of Functional Blocks of Inkjet Recording Device

Figure 4:
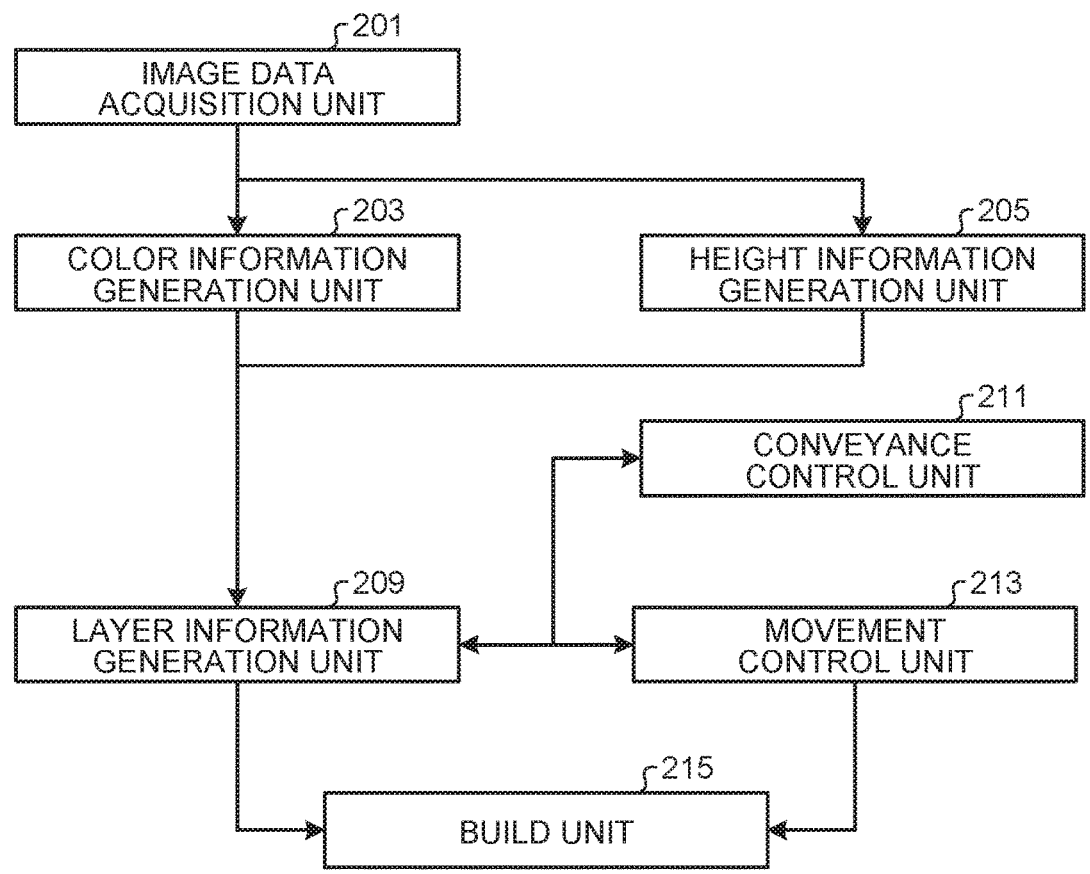
FIG. 4 is a diagram illustrating an example configuration of functional blocks of the inkjet recording device according to the embodiment.
Figure 5:
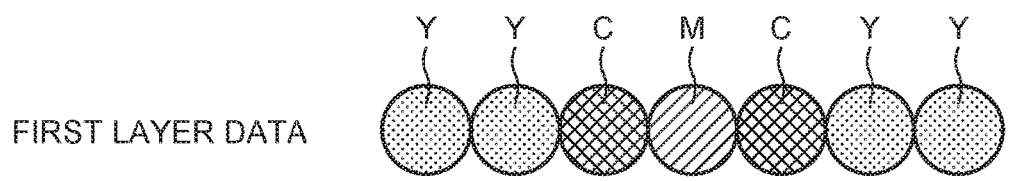
FIG. 5 is a diagram illustrating example color information according to the embodiment.
Figure 6:
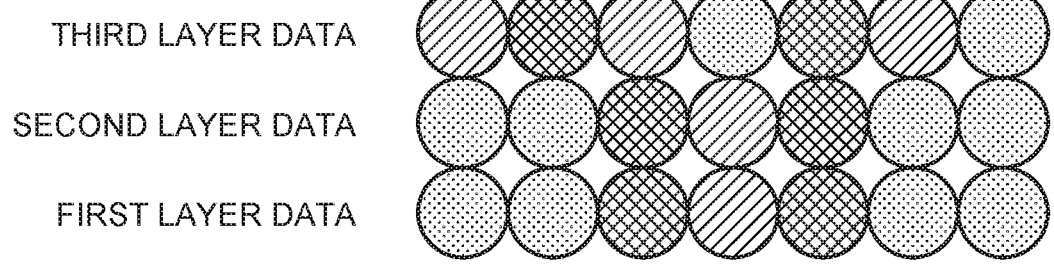
FIG. 6 is a diagram illustrating another example of the color information according to the embodiment.
Figure 7:
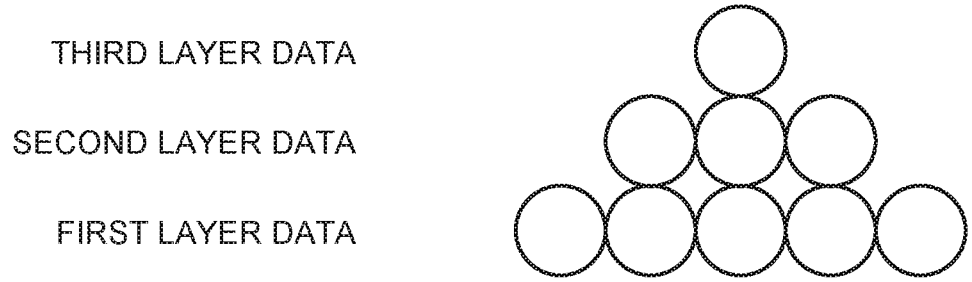
FIG. 7 is a diagram illustrating example height information according to the embodiment.
Figure 8:
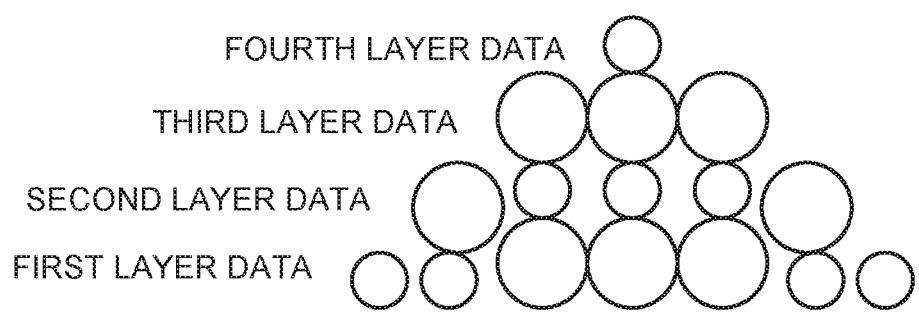
FIG. 8 is a diagram illustrating another example of the height information according to the embodiment.
Figure 9:
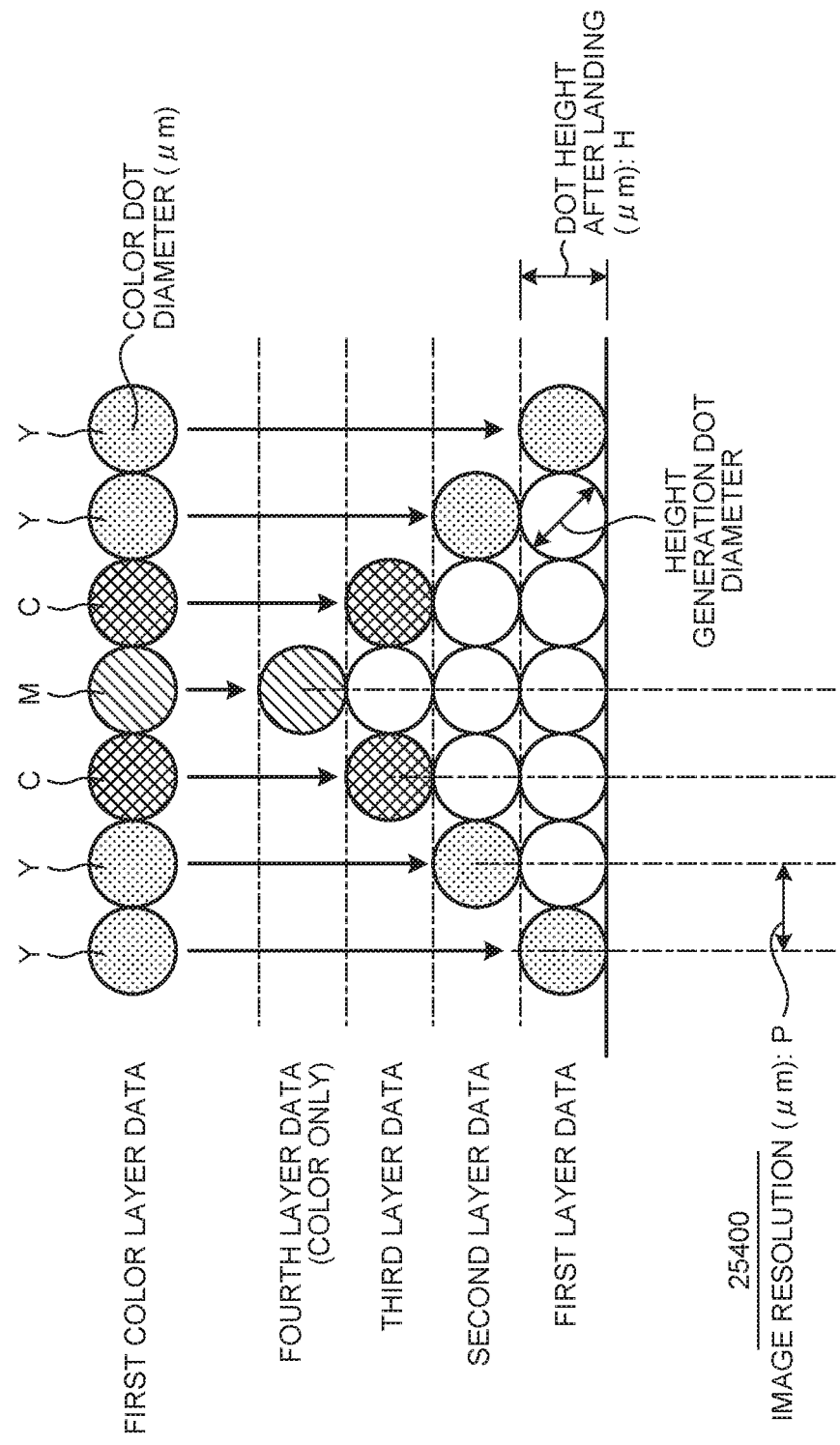
FIG. 9 is a diagram illustrating an example method of generating layer information according to the embodiment.

FIG. 4 is a diagram illustrating an example configuration of functional blocks of the inkjet recording device according to the embodiment. FIG. 5 is a diagram illustrating example color information according to the embodiment. FIG. 6 is a diagram illustrating another example of the color information according to the embodiment. FIG. 7 is a diagram illustrating example height information according to the embodiment. FIG. 8 is a diagram illustrating another example of the height information according to the embodiment. FIG. 9 is a diagram illustrating an example method of generating layer information according to the embodiment.

As illustrated in FIG. 4, the inkjet recording device 1 includes an image data acquisition unit 201, a color information generation unit 203, a height information generation unit 205, a layer information generation unit 209 (generation unit), a conveyance control unit 211, a movement control unit 213, and a build unit 215. The image data acquisition unit 201 is implemented by, for example, the control device 101, the main memory 102, and the communication device 106. The color information generation unit 203, the height information generation unit 205, the layer information generation unit 209, and the conveyance control unit 211 are implemented by, for example, the control device 101 and the main memory 102. The movement control unit 213 and the build unit 215 can be implemented by, for example, the head unit 15.

The image data acquisition unit 201 acquires image data of a 3D object. The image data of a 3D object is, for example, captured image data of a 3D object to be built. If, for example, a painting is a target 3D object to be built, the image data of the 3D object is a captured image data of this painting.

The image data acquisition unit 201 may acquire image data of a 3D object from an external device such as a personal computer (PC) or may acquire image data of a 3D object stored in, for example, the auxiliary memory 103. The image data of a 3D object described in the present embodiment is image data represented in RGB color space, but the image data is not limited to this.

The color information generation unit 203 generates color information that indicates the color of each pixel in the 3D object based on the image data of the 3D object acquired by the image data acquisition unit 201. The color information generation unit 203 generates the color information by, for example, converting image data represented in RGB color space acquired by the image data acquisition unit 201 into image data represented by CMYK color space. Conversion (color space conversion) of the image data represented by RGB color space into image data represented by CMYK color space can be performed by using a known method. Since the generated color information is used for building a 3D object, the color information may be subjected to additional processing specific to a build process of a 3D object.

As illustrated in FIG. 5, the color information in the present embodiment is information on a single layer. This is because color reproducibility is lowered if a color layer is deposited on another color layer. In this regard, as illustrated in FIG. 6, if as many pieces of color information as the layers are generated, the inkjet recording device 1 basically uses color information on the first layer, and the color information on the second or further layers is not used. In other words, the color information considered in the present embodiment is two-dimensional information (although color information in FIGS. 5 and 6 is represented one-dimensionally).

In the example illustrated in FIG. 5, reference sign Y indicates that the color of the pixel, which may be hereinafter referred to as "dot", is yellow, reference sign C indicates that the pixel color is cyan, reference sign M indicates that the pixel color is magenta, and reference sign K indicates that the pixel color is black. In the other drawings referred to below, pixels having the same pattern as the pixel indicated by reference sign Y are yellow pixels, those having the same pattern as the pixel indicated by reference sign C are cyan pixels, those having the same pattern as the pixel indicated by reference sign M are magenta pixels, and those having the same pattern as the pixel indicated by reference sign K are black pixels.

The height information generation unit 205 generates height information that indicates the height of each pixel in the 3D object based on the image data of the 3D object acquired by the image data acquisition unit 201. To generate the height information, the height information generation unit 205 may use a known method of obtaining the height (Z-coordinate) of each pixel from two-dimensional image data. This method is disclosed in, for example, Japanese Unexamined Patent Application Publication No. 2013-230625.

As illustrated in FIG. 7, the height information in the present embodiment is information on a plurality of layers. In other words, the height information in the present embodiment is three-dimensional information (although the height information in FIG. 7 is represented two-dimensionally). Specifically, for example, the height information is information indicating whether a dot is present at the respective positions of three-dimensional coordinates. For the most part, the height information is represented in pyramidal shape with the lower side being the base as illustrated in FIG. 7. The height information is not limited to this and has some exceptions.

As described above, the inkjet head 14 ejects the UV curable ink 12 in different dot diameters in accordance with the pixel position and in which layer the pixel is located in the 3D object to be built. FIG. 8 illustrates example height information represented by dots ejected in different diameters in accordance with the pixel position and in which layer the pixel is located in the 3D object. The 3D object represented by the height information in FIG. 8 is built, or formed, with dots having a smaller diameter, which may be hereinafter referred to as "small dots", and dots having a larger diameter, which may be hereinafter referred to as "large dots", and these dots are included in an identical layer. In this regard, the height information for use in building a 3D object includes, in addition to the three-dimensional information described above, information on the type of dot diameters of each pixel, which may be hereinafter simply referred to as "dot diameter information". Furthermore, as described above, the inkjet recording device 1 according to the present embodiment controls the ejection gap 18 in performing the ejection operation in accordance with the dot diameter of each dot of the UV curable ink 12. In this regard, the height information for use in building a 3D object further includes information on the ejection gap 18, which may be hereinafter simply referred to as "gap information", corresponding to the dot of each pixel. The gap information included in the height information may be information on the head-to-medium gap 19 corresponding to the dot of each pixel instead of the information on the ejection gap 18 corresponding to the dot of each pixel.

The layer information generation unit 209 generates layer information (slice information) indicating the pixel position (three-dimensional information), the dot diameter information, and the gap information on each layer for use in building a 3D object.

In the present embodiment, as illustrated in FIG. 9, the layer information generation unit 209 generates 3D-object information from which the layer information is generated, by placing dots indicated by the color information generated by the color information generation unit 203 on the dots indicated by the height information generated by the height information generation unit 205. For ease of discussion, the dots of the pixels illustrated in FIG. 9 have the same diameter (dot height H after landing). The layer information generation unit 209 divides the 3D-object information into pieces of layer-based information, and generates the layer information (information on four layers in the example in FIG. 9) including the information on pixels in each layer. The layer information generation unit 209 divides the generated layer information into layer shape information indicating the positions of dots for building the shape of the 3D object and layer color information indicating the positions of dots for forming the color of the 3D object. In the example illustrated in FIG. 9, the layer information on the uppermost fourth layer only includes layer color information.

To create dots (color dots) of UV curable ink indicated by the color information, this UV curable ink covers the dots (height generation dots) of the UV curable ink indicated by the height information. The diameter of the dots indicated by the color information (color dot diameter) and the image resolution of the color dots are determined from the perspective of higher color reproducibility and higher image quality, for example. Specifically, in a preferred embodiment, the image resolution of the color dots is equal to or higher than the image resolution of the height generation dots, and the color dot diameter is smaller than that of the height generation dots (height generation dot diameter), and the color dots are formed with more UV curable ink than the height generation dots for forming the color.

The conveyance control unit 211 controls the conveyance of the recording medium on which a 3D object is built by the head unit 15.

The movement control unit 213 controls the movement of the head unit 15, that is, reciprocating movement in the sub-scanning direction, reciprocating movement in the main-scanning direction, and movement in the vertical direction.

The build unit 215 builds a 3D object by depositing the UV curable ink on a recording medium based on the layer information indicating information on each layer generated by the layer information generation unit 209. The build unit 215 uses a UV curable ink having a color different from the colors indicated by the color information. In the present embodiment, the build unit 215 uses white (W) UV curable ink for building the shape of a 3D object, but the color of the UV curable ink is not limited to this. The build unit 215 may use clear (CL) UV curable ink, or use the mixture of the white (W) UV curable ink and the clear (CL) UV curable ink for building the shape of a 3D object.

The image data acquisition unit 201, the color information generation unit 203, the height information generation unit 205, the layer information generation unit 209, the conveyance control unit 211, the movement control unit 213, and the build unit 215 illustrated in FIG. 4 are conceptual functions, and the functional configuration is not limited to this. For example, some functional units illustrated as separate units in FIG. 4 may be configured as one functional unit. The function of a functional unit in FIG. 4 may be divided into a plurality of functions and configured as a plurality of functional units.

Build Process of Inkjet Recording Device

FIGS. 10 to 13 are diagrams illustrating an example method of building a 3D object according to the embodiment. With reference to FIGS. 10 to 13, basic operations of the build process performed by the inkjet recording device 1 according to the present embodiment will be described. In the description with reference to FIGS. 10 to 13, the dot diameters are the same for ease of discussion.

In the present embodiment, the build unit 215 delays the deposition of the UV curable ink based on the layer color information of the layer information by m layers cycles (m is a natural number equal to or larger than one) after the deposition of the UV curable ink based on the layer shape information in the same layer. With reference to FIGS. 10 to 13, a deposition process in the case of m=1 is described. The deposition process described below is based on the layer information illustrated in FIG. 9.

Figure 10:
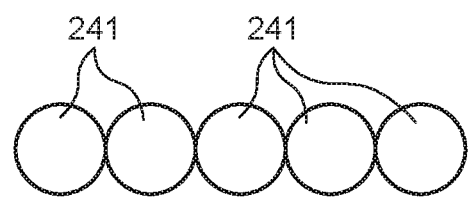
FIG. 10 is a diagram illustrating an example method of building a 3D object according to the embodiment.

First, as illustrated in FIG. 10, the build unit 215 deposits dots 241 indicated by the layer shape information on the first layer on the recording medium with white (W) UV curable ink.

Figure 11:
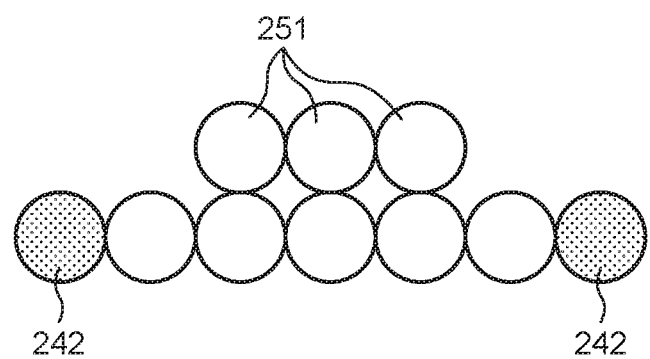
FIG. 11 is another diagram illustrating the example method of building a 3D object according to the embodiment.

As illustrated in FIG. 11, the build unit 215 deposits dots 251 indicated by the layer shape information on the second layer on the dots 241 with white (W) UV curable ink, and at the same time, deposits dots 242 indicated by the layer color information on the first layer on the recording medium with yellow (Y) UV curable ink.

Figure 12:
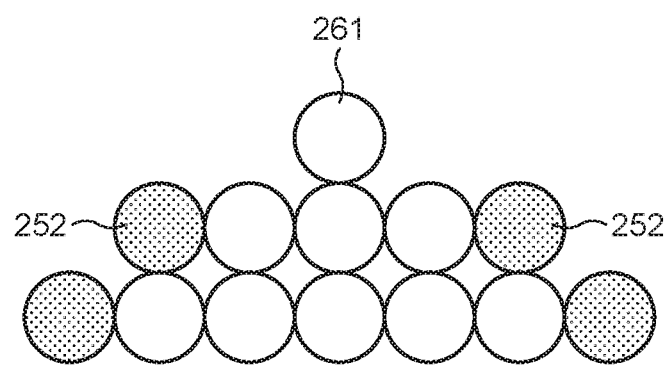
FIG. 12 is still another diagram illustrating the example method of building a 3D object according to the embodiment.

As illustrated in FIG. 12, the build unit 215 deposits a dot 261 indicated by the layer shape information on the third layer on a dot 251 with white (W) UV curable ink, and at the same time, deposits dots 252 indicated by the layer color information on the second layer on the dots 241 with yellow (Y) UV curable ink.

Figure 13:
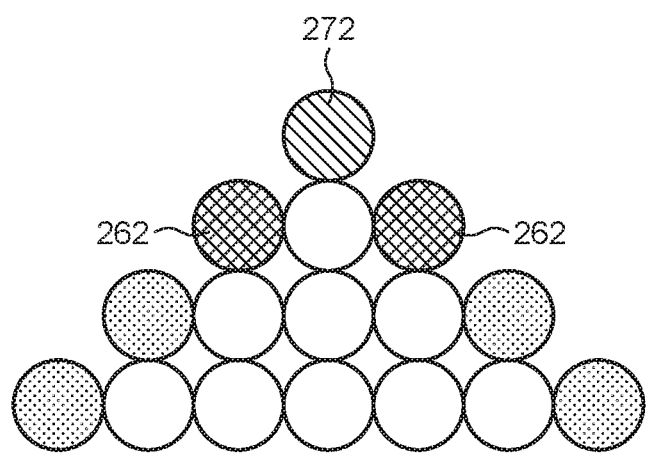
FIG. 13 is yet another diagram illustrating the example method of building a 3D object according to the embodiment.

Lastly, as illustrated in FIG. 13, the build unit 215 deposits dots 262 indicated by the layer color information on the third layer on the dots 251 with cyan (C) UV curable ink, and at the same time, deposits a dot 272 indicated by the layer color information on the fourth layer (final layer) on the dot 261 with magenta (M) UV curable ink.

With a greater value of m, the UV curable inks for coloring such as yellow (Y), cyan (C), and magenta (M) inks are irradiated with UV curing light in fewer times. This can prevent degradation of these UV curable inks, leading to a higher color reproducibility of the 3D object.

FIGS. 14A and 14B are diagrams illustrating comparison between building a 3D object with large dots and building a 3D object with small dots. FIG. 14A illustrates a 3D object made of three layers built with large dots, and FIG. 14B illustrates a 3D object made of three layers built with small dots. As illustrated in FIGS. 14A and 14B, the dots having the respective diameters are ejected from the head ejection surface 11a with the ejection gap 18, which may be the head-to-medium gap 19 as described above, indicated by the gap information included in the height information. This configuration can provide a suitable ejection gap 18, or head-to-medium gap 19, for each dot, and can minimize the deviation in landing, reduce banding, achieve shape stability, and reduce ink misting.

Figure 15:
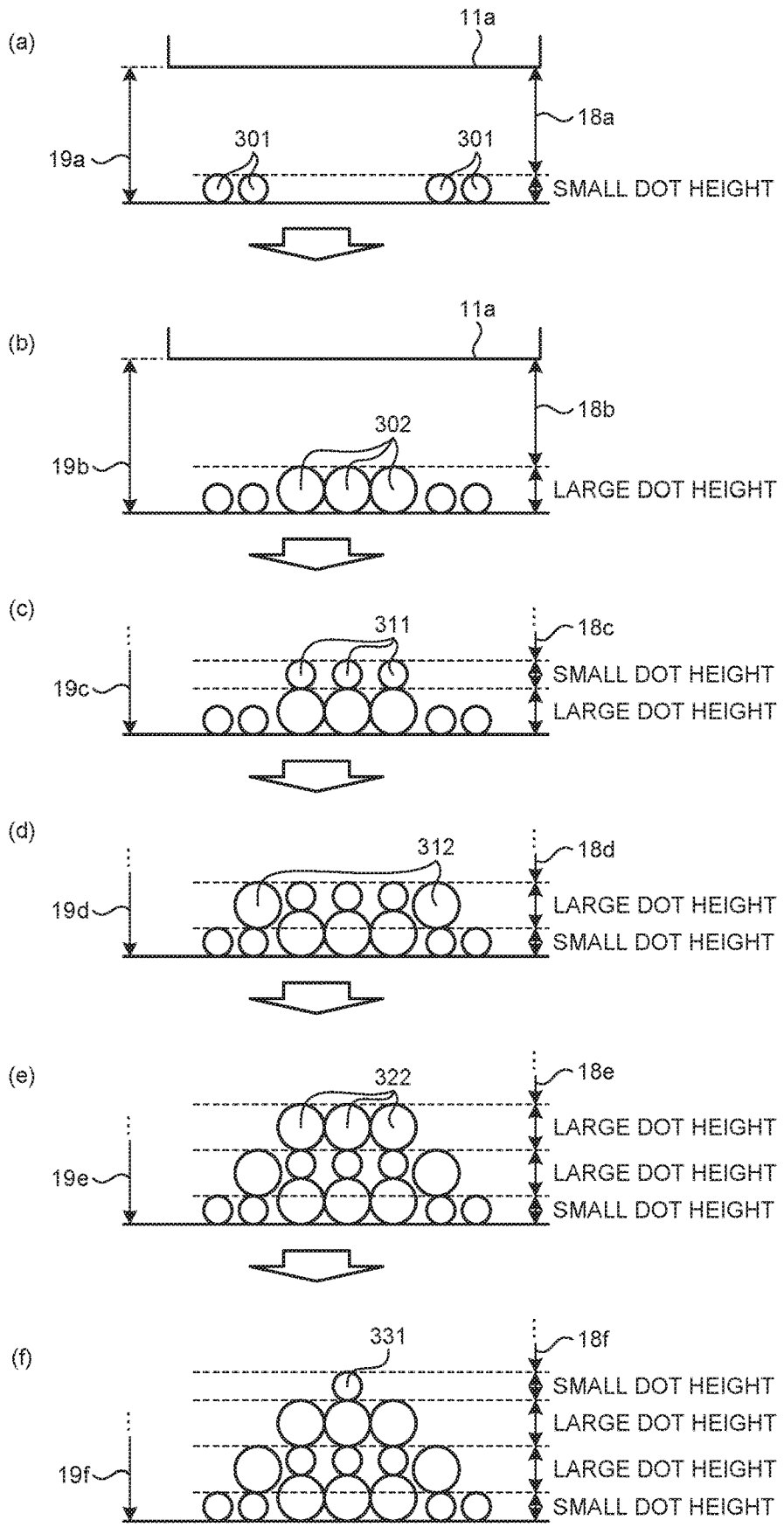
FIG. 15 is a diagram illustrating an example method of building a 3D object according to the embodiment.

FIG. 15 is a diagram illustrating an example method of building a 3D object according to the embodiment. A build process of a 3D object made of small and large dots will be described in detail with reference to FIG. 15. FIG. 15 mainly illustrates the build process of building the shape portions of the 3D object indicated by the layer shape information. As for the build process of dots indicated by the layer color information, the operation described with reference to FIGS. 10 to 13 can be applied. The build process described herein is based on the layer information (layer shape information) illustrated in FIG. 8.

First, as illustrated at (a) in FIG. 15, the movement control unit 213 causes vertical movement based on the gap information corresponding to small dots included in the layer shape information on the first layer such that the head ejection surface 11a is away from the vertex of the small dots in a deposited state by an ejection gap 18a, or a head-to-medium gap 19a, indicated by the gap information, and the movement control unit 213 causes movement in the sub-scanning direction (the forward path). At this time, as illustrated at (a) in FIG. 15, the build unit 215 deposits small dots 301 indicated by the layer shape information on the first layer on the recording medium with white (W) UV curable ink.

As illustrated at (b) in FIG. 15, the movement control unit 213 causes vertical movement based on the gap information corresponding to large dots included in the layer shape information on the first layer such that the head ejection surface 11a is away from the vertex of the large dots in a deposited state by an ejection gap 18b, or a head-to-medium gap 19b, indicated by the gap information, and cases movement in the sub-scanning direction (the return path). At this time, as illustrated at (b) in FIG. 15, the build unit 215 deposits large dots 302 indicated by the layer shape information on the first layer on the recording medium with white (W) UV curable ink.

As illustrated at (c) in FIG. 15, the movement control unit 213 causes vertical movement based on the gap information corresponding to small dots included in the layer shape information on the second layer such that the head ejection surface 11a is away from the vertex of the small dots in a deposited state by an ejection gap 18c, or a head-to-medium gap 19c, indicated by the gap information, and the movement control unit 213 causes movement in the sub-scanning direction (the forward path). At this time, as illustrated at (c) in FIG. 15, the build unit 215 deposits small dots 311 indicated by the layer shape information on the second layer on the dots 302 with white (W) UV curable ink.

As illustrated at (d) in FIG. 15, the movement control unit 213 causes vertical movement based on the gap information corresponding to large dots included in the layer shape information on the second layer such that the head ejection surface 11a is away from the vertex of the large dots in a deposited state by an ejection gap 18d, or a head-to-medium gap 19d, indicated by the gap information, and the movement control unit 213 causes movement in the sub-scanning direction (the return path). At this time, as illustrated at (d) in FIG. 15, the build unit 215 deposits large dots 312 indicated by the layer shape information on the second layer on the dots 301 with white (W) UV curable ink.

As illustrated at (e) in FIG. 15, the movement control unit 213 causes vertical movement based on the gap information corresponding to large dots included in the layer shape information on the third layer such that the head ejection surface 11a is away from the vertex of the large dots in a deposited state by an ejection gap 18e, or a head-to-medium gap 19e, indicated by the gap information, and the movement control unit 213 causes movement in the sub-scanning direction (the forward path). At this time, as illustrated at (e) in FIG. 15, the build unit 215 deposits large dots 322 indicated by the layer shape information on the third layer on the dots 311 with white (W) UV curable ink.

Lastly, as illustrated at (f) in FIG. 15, the movement control unit 213 causes vertical movement based on the gap information corresponding to small dots included in the layer shape information on the fourth layer such that the head ejection surface 11a is away from the vertex of the small dots in a deposited state by an ejection gap 18f, or a head-to-medium gap 19f, indicated by the gap information, and the movement control unit 213 causes movement in the sub-scanning direction (the return path). At this time, as illustrated at (f) in FIG. 15, the build unit 215 deposits a small dot 331 indicated by the layer shape information on the fourth layer on a dot 322 with white (W) UV curable ink.

As described above, since the head unit 15 deposits the small or large dots while providing an ejection gap 18, or by the head-to-medium gap 19, corresponding to the small or large dots, this configuration can minimize the deviation in landing, reduce banding, achieve shape stability, and reduce ink misting.

Although FIG. 15 illustrates an example method of building a 3D object with small dots and large dots, or dots with two types of dot diameters, the dot diameters are not limited to this and the 3D object may be built with dots with three or more dot diameters.

Procedure of 3D Object Production Process of Inkjet Recording Device

FIG. 16 is a flowchart illustrating an example procedure of a 3D-object production process according to the embodiment. FIG. 17 is a flowchart illustrating an example procedure of a build process of the 3D-object production process.

First, the image data acquisition unit 201 acquires image data of a 3D object (Step S11).

The color information generation unit 203 generates color information indicating the color of each pixel in the 3D object based on the image data of the 3D object acquired by the image data acquisition unit 201 (Step S12).

The height information generation unit 205 generates height information including three-dimensional information, dot diameter information, and gap information on each pixel of the 3D object based on the image data of the 3D object acquired by the image data acquisition unit 201 (Step S13).

The layer information generation unit 209 generates layer information based on the color information generated by the color information generation unit 203 and the height information generated by the height information generation unit 205 (Step S14). The layer information is information on each layer for use in building a 3D object having a surface covered with colors indicated by the color information.

The build unit 215 performs the build process of building a 3D object by depositing UV curable ink on a recording medium based on the layer information on each layer generated by the layer information generation unit 209 (Step S15).

Described next is the detailed build process at Step S15 in FIG. 16 with reference to FIG. 17.

First, the movement control unit 213 causes vertical movement based on the gap information corresponding to small dots included in the layer shape information on the first layer such that the head ejection surface 11a is away from the vertex of the small dots in a deposited state by the ejection gap 18, or by the head-to-medium gap 19, indicated by the gap information, and the movement control unit 213 causes movement in the sub-scanning direction (the forward path). At this time, the build unit 215 deposits small dots indicated by the layer shape information on the first layer on the recording medium with white (W) UV curable ink (Step S151).

The movement control unit 213 causes vertical movement based on the gap information corresponding to large dots included in the layer shape information on the first layer such that the head ejection surface 11a is away from the vertex of the large dots in a deposited state by the ejection gap 18, or by the head-to-medium gap 19, indicated by the gap information, and the movement control unit 213 causes movement in the sub-scanning direction (the return path). At this time, the build unit 215 deposits large dots indicated by the layer shape information on the first layer on the recording medium with white (W) UV curable ink (Step S152).

The movement control unit 213 causes vertical movement based on the gap information corresponding to small dots included in the layer shape information on the second layer such that the head ejection surface 11a is away from the vertex of the small dots in a deposited state by the ejection gap 18, or by the head-to-medium gap 19, indicated by the gap information, and the movement control unit 213 causes movement in the sub-scanning direction (the forward path). At this time, the build unit 215 deposits small dots indicated by the layer shape information on the second layer on the dots indicated by the layer shape information on the first layer with white (W) UV curable ink (Step S153).

The movement control unit 213 causes vertical movement based on the gap information corresponding to large dots included in the layer shape information on the second layer such that the head ejection surface 11a is away from the vertex of the large dots in a deposited state by the ejection gap 18, or by the head-to-medium gap 19, indicated by the gap information, and the movement control unit 213 causes movement in the sub-scanning direction (the return path). At this time, the build unit 215 deposits large dots indicated by the layer shape information on the second layer on the dots indicated by the layer shape information on the first layer with white (W) UV curable ink (Step S154).

The movement control unit 213 and the build unit 215 repeats the operations above until the (n−1)th layer is deposited.

The movement control unit 213 causes vertical movement based on the gap information corresponding to small dots included in the layer shape information on the nth layer (final layer) such that the head ejection surface 11a is away from the vertex of the small dots in a deposited state by the ejection gap 18, or by the head-to-medium gap 19, indicated by the gap information, and the movement control unit 213 causes movement in the sub-scanning direction (the forward path). At this time, the build unit 215 deposits small dots indicated by the layer shape information on the nth layer on the dots indicated by the layer shape information on the (n−1)th layer with white (W) UV curable ink (Step S155).

Lastly, the movement control unit 213 causes vertical movement based on the gap information corresponding to large dots included in the layer shape information on the nth layer such that the head ejection surface 11a is away from the vertex of the large dots in a deposited state by the ejection gap 18, or by the head-to-medium gap 19, indicated by the gap information, and the movement control unit 213 causes movement in the sub-scanning direction (the return path). At this time, the build unit 215 deposits large dots indicated by the layer shape information on the nth layer on the dots indicated by the layer shape information on the (n−1)th layer with white (W) UV curable ink (Step S156).

In the present embodiment as described above, the UV curable ink 12 is ejected in a different dot diameter in accordance with the pixel position and in which layer the pixel is located in a 3D object to be built. The height information for use in building the 3D object includes the pixel position (three-dimensional information), dot diameter information, and gap information on each layer. This height information and the color information are used to generate the layer information. This configuration can provide a suitable ejection gap 18, or head-to-medium gap 19, for each dot, and can minimize the deviation in landing, reduce banding, achieve shape stability, and reduce ink misting. In this regard, differences accumulated in the layers in building a 3D object can be reduced and degradation of reproducibility in color and shape can be prevented.

The head unit 15 according to the present embodiment includes the UV irradiation devices 13 and 17 at opposing sides relative to the inkjet head 14 in the sub-scanning direction. This configuration allows the head unit 15 to build the 3D object while moving in both the forward and return paths in the sub-scanning direction, which can increase productivity in producing the 3D object.

The height information generation unit 205 may generate the height information by three-dimensionally measuring an object to be built. The height information generation unit 205 may generate the height information by using the image data of a 3D object acquired by the image data acquisition unit 201 and the three-dimensional measurement on an object to be built.

The height information generation unit 205 may be configured to acquire the height information on the 3D object. If, for example, a 3D object to be built is a painting, the museum or other facilities that store the painting may have the height information as data of the painting. In this case, the height information generation unit 205 may acquire the height information on the 3D object externally.

In building the shape of a 3D object, for example, the build unit 215 may use the UV curable ink in any color to build portions of the 3D object other than colored portions. To build the colored portions on which colors indicated by the color information are to be deposited, the build unit 215 uses the UV curable ink having a color different from the colors indicated by the color information. This configuration can achieve a higher reproducibility in color and shape in building a 3D object and can increase the building speed of the 3D object.

Modification

The embodiment above describes an example of an ink jetting method. Described in a modification of the embodiment is a mechanical configuration of a head unit 1015 implementing fused deposition modeling.

FIG. 18 is a diagram illustrating an example mechanical configuration of the head unit according to the modification. As illustrated in FIG. 18, the head unit 1015 includes a (thermal) fusion head 1020.

The fusion head 1020 includes fusion ink 1023 in some colors. The fusion head 1020 heats the fusion ink 1023 and ejects the heated fusion ink 1023 on a recording medium 16 to cause the ink to be fixed as fused ink 1012 to the recording medium 16. The fusion ink 1023 includes white (W), clear (CL), yellow (Y), cyan (C), magenta (M), and black (K) fusion inks in the same manner as the ink jetting method.

If at least one of the functional units of the inkjet recording device 1 according to the embodiment and the modification above is implemented by execution of a computer program, the computer program is embedded and provided in a ROM, for example. The computer program executed by the inkjet recording device 1 according to the embodiment and the modification above may be recorded and provided on a computer-readable recording medium such as a compact disc read only memory (CD-ROM), a flexible disk (FD), a compact disc recordable (CD-R), and a digital versatile disc (DVD), as an installable or executable file. The computer program executed by the inkjet recording device 1 according to the embodiment and the modification above may be stored in a computer connected to a network such as the Internet and provided by being downloaded via the network. Furthermore, the computer program executed by the inkjet recording device 1 according to the embodiment and the modification above may be provided or distributed via a network such as the Internet. Moreover, the computer program executed by the inkjet recording device 1 according to the embodiment and the modification above has a module configuration including at least one of the functional units described above. As actual hardware, the functional units are loaded and generated on a main memory (e.g., main memory 102) when a CPU (control device 101) reads the program from the recording medium (e.g., auxiliary memory 103) and executes it.

According to the present invention, a 3D object can be built with smaller differences accumulated in the layers of the 3D object and without degrading reproducibility in color and shape.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A three dimensional object building device comprising:
   circuitry configured to generate layer information for each layer of a three-dimensional (3D) object from height information and color information, the height information including information on a three-dimensional position of each pixel of the 3D object, information on a diameter of a dot of build material for the pixel, and information on a gap from an ejection surface of a build unit when the build material for the pixel is to be ejected, the color information indicating a color of each pixel of the 3D object; and a movement controller configured to, when build material for a pixel indicated by the layer information is to be deposited, move the build unit to make the gap correspond to a diameter of a dot for the pixel, wherein the movement controller is further configured to, when the layer information indicates that dots of build material included in an identical layer have different diameters, move the build unit to change the gap during forming of the identical layer to make different gaps respectively correspond to the different diameters of the dots to cause the build unit to respectively deposit the dots of the build material in accordance with the diameters.

2. The three dimensional object building device according to claim 1, wherein a gap indicated by information on the gap included in the height information is a distance from the ejection surface to a vertex of build material for a pixel indicated by the height information when the build material is landed.

3. The three dimensional object building device according to claim 1, wherein a gap indicated by information on the gap included in the height information is a distance from the ejection surface to a recording medium on which the 3D object is built.

4. The three dimensional object building device according to claim 1, wherein the movement controller is configured to, when the layer information indicates that dots of build material included in an identical layer have different diameters, move the build unit to make gaps correspond to the diameters of the dots in ascending order of the diameters of the dots to cause the build unit to deposit the dots of the build material for each of the diameters.

5. The three dimensional object building device according to claim 1, wherein the build unit includes curing light irradiation units upstream and downstream of the ejection surface in a sub-scanning direction, the curing light irradiation units being configured to emit curing light for curing build material deposited on a recording medium, and the movement controller is configured to move the build unit such that the build unit deposits the build material in both forward and return paths in the sub-scanning direction.

6. The three dimensional object building device according to claim 1, wherein the color information is information for a single layer, and build material for use in building a shape portion of the 3D object, the shape portion being a portion on which a color indicated by the color information is deposited, has a color different from the color indicated by the color information.

7. The three dimensional object building device according to claim 1, further comprising the build unit, wherein the build unit is configured to deposit build material indicated by the color information in a final layer of the 3D object to build the 3D object.

8. A three dimensional object building method comprising:

generating layer information for each layer of a three-dimensional (3D) object from height information and color information, the height information including information on a three-dimensional position of each pixel of the 3D object, information on a diameter of a dot of build material for the pixel, and information on a gap from an ejection surface of a build unit when the build material for the pixel is to be ejected, the color information indicating a color of each pixel of the 3D object; and when build material for a pixel indicated by the layer information is deposited, moving the build unit to make the gap correspond to a diameter of a dot for the pixel, wherein when the layer information indicates that dots of build material included in an identical layer have different diameters, the build unit is moved to change the gap during forming of the identical layer to make different gaps respectively correspond to the different diameters of the dots to cause the build unit to respectively deposit the dots of the build material in accordance with the diameters.

9. The three dimensional object building method according to claim 8, wherein a gap indicated by information on the gap included in the height information is a distance from the ejection surface to a vertex of build material for a pixel indicated by the height information when the build material is landed.

10. The three dimensional object building method according to claim 8, wherein a gap indicated by information on the gap included in the height information is a distance from the ejection surface to a recording medium on which the 3D object is built.

11. A method of producing a three-dimensional (3D) object, the method comprising:

generating layer information for each layer of the 3D object from height information and color information, the height information including information on a three-dimensional position of each pixel of the 3D object, information on a diameter of a dot of build material for the pixel, and information on a gap from an ejection surface of a build unit when build material for the pixel is ejected, the color information indicating a color of each pixel of the 3D object;

when build material for a pixel indicated by the layer information is deposited, moving the build unit to make a gap correspond to a diameter of a dot for the pixel; and causing the build unit to deposit the build material for the pixel indicated by the layer information at a height for making the gap, to building the 3D object, wherein when the layer information indicates that dots of build material included in an identical layer have different diameters, the build unit is moved to change the gap during forming of the identical layer to make different gaps respectively correspond to the different diameters of the dots to cause the build unit to respectively deposit the dots of the build material in accordance with the diameters.

12. The method of producing a three-dimensional (3D) object according to claim 11, wherein a gap indicated by information on the gap included in the height information is a distance from the ejection surface to a vertex of build material for a pixel indicated by the height information when the build material is landed.

13. The method of producing a three-dimensional (3D) object according to claim 11, wherein a gap indicated by information on the gap included in the height information is a distance from the ejection surface to a recording medium on which the 3D object is built.

* * * * *